Nov. 20, 1928.
F. R. McGEE
1,691,982
OPEN HEARTH FURNACE
Filed Aug. 9, 1926 3 Sheets-Sheet 1
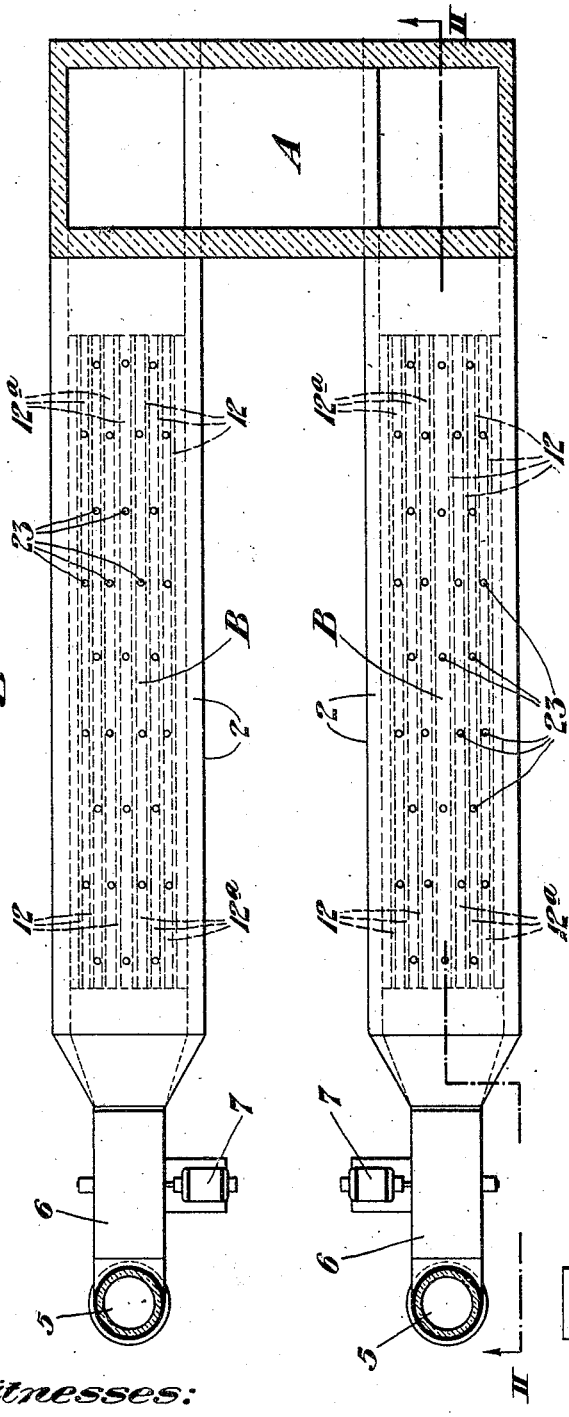
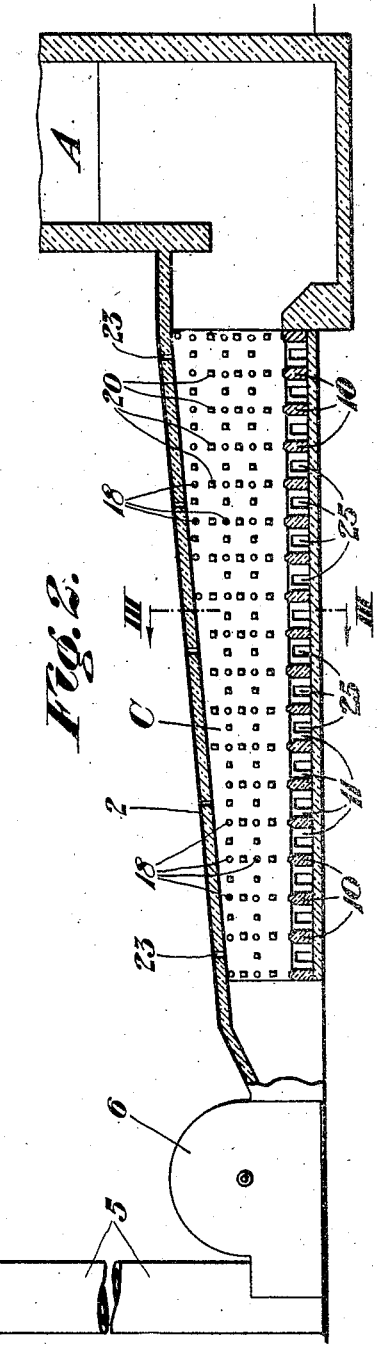
Inventor:
FRANK R. McGEE,

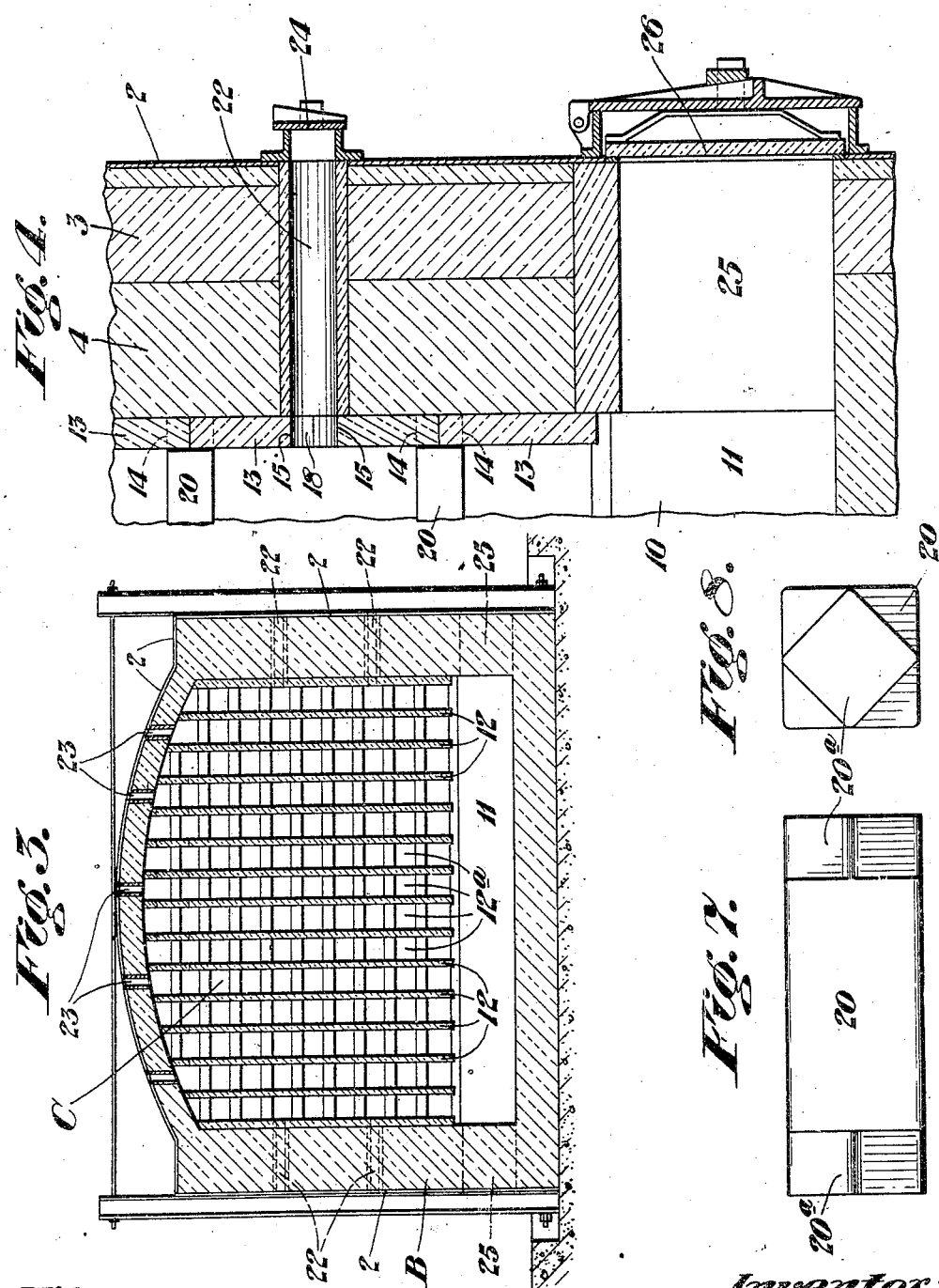

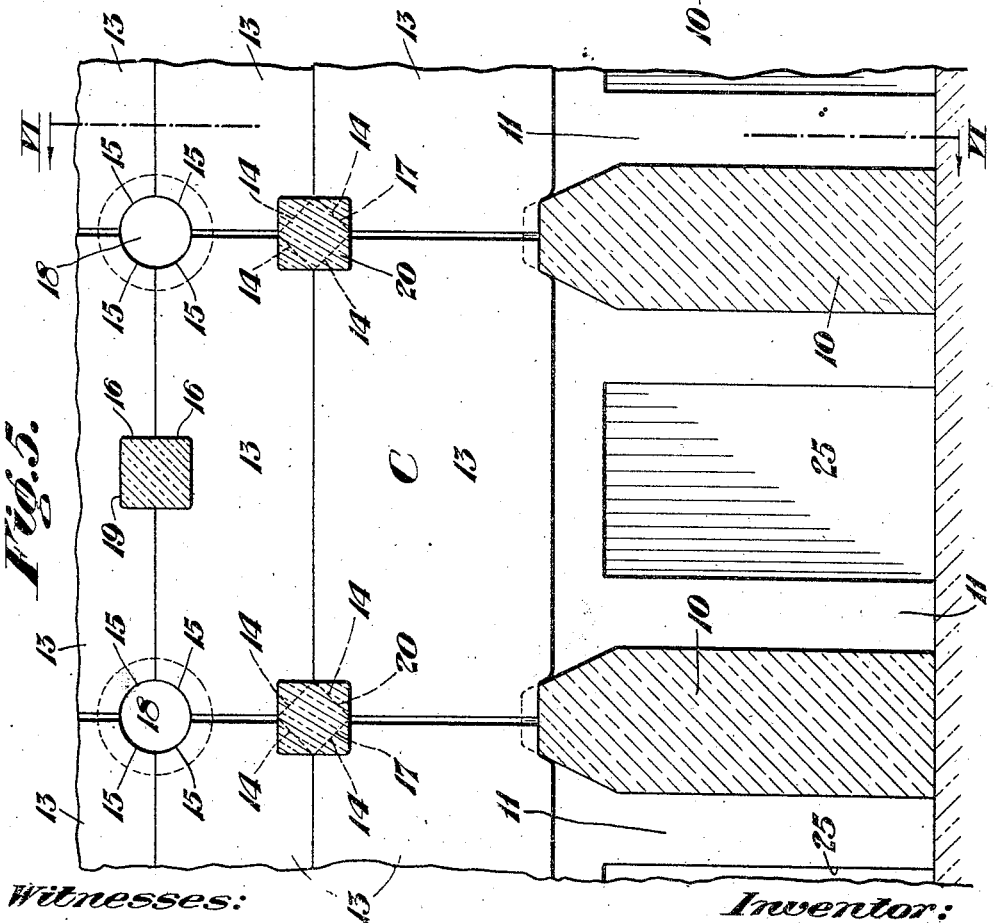

Patented Nov. 20, 1928.

1,691,982

UNITED STATES PATENT OFFICE.

FRANK R. McGEE, OF STEUBENVILLE, OHIO.

OPEN-HEARTH FURNACE.

Application filed August 9, 1926. Serial No. 128,252.

This invention relates to regenerative furnaces, and more particularly to the regenerative chambers of open hearth furnaces, and has for one of its objects the provision of an improved form of regenerative chamber which will be materially more efficient than the forms of chambers heretofore provided.

Another object is to provide regenerative chambers having an improved and novel form of checkerwork arranged to have an even distribution of the gases therein.

Another object is to provide a checkerwork with dust pockets above the floor or ground level for collecting the dust from the checkerwork so that it may be readily removed.

A further object is to provide a regenerative chamber construction having checkerwork from which the dust may be readily removed.

A still further object is to provide regenerative chambers for open hearth furnaces having the novel construction, design and combination of parts hereinafter described and illustrated in the accompanying drawings.

In the drawings—

Figure 1 is a plan showing an open hearth furnace having regenerative chambers constructed in accordance with this invention.

Figure 2 is a side elevation, partly in section, the section being taken on the line II—II of Figure 1.

Figure 3 is a sectional end elevation taken on the line III—III of Figure 2.

Figure 4 is a sectional elevation on a larger scale, showing details of the construction of regenerator side walls.

Figure 5 is a sectional side elevation, on a larger scale, showing details in the construction of the checker walls of the regenerators.

Figure 6 is a transverse sectional elevation taken on the line VI—VI of Figure 5.

Figure 7 is a plan and Figure 8 an end elevation of the tiles or baffle bricks forming part of this invention.

Referring more particularly to the drawings, the letter A designates the open hearth furnace which may be of any ordinary standard design, and B designates the regenerative chambers.

The chambers B are built entirely above the floor or ground level, and comprise an enclosing shell or wall composed of a steel casing 2, a heat insulating lining 3, and a brick or tile wall 4. The shell or wall communicates at one end with the furnace A, and at its other end with a stack 5; and tapers gradually vertically from the furnace end to the stack end, so as to reduce its volume. By reducing the volume of the regenerative chambers toward the stack, the velocity of the gases as they cool after leaving the furnace is maintained substantially constant.

Each of the regenerative chambers B is provided with an individual stack 5 and an induced draft fan 6, of the reversing type, driven by a motor 7 is mounted at the base of each stack, so that in order to reverse the operation of the regenerators it is only necessary to reverse the operation of the fans 6.

A novel form of checkerwork C is built in the chambers B, and comprises a dust chamber base composed of transverse, vertically disposed, spaced walls 10. The spaces 11 between the walls 10 form dust pockets into which the dust from the checkerwork is collected.

A plurality of vertically disposed, longitudinal checker walls 12 are supported on the walls 10 and spaced transversely from each other to form gas channels 12ª. The walls 12 are composed of a series of bricks or tiles 13 laid up edgewise, one on top of the other. The bricks or tiles 13 have two opposite corners cut away on an angle, as at 14, and the other two opposite corners cut away on a curve forming a segment of a circle, as at 15, and the side edge of the brick intermediate the curved cut corners 15 is provided with a rectangular recess 16. The bricks or tiles 13 are laid up so that the angularly cut corners 14 of four bricks abut to form rectangular or square openings 17, while the filleted corners 15 abut to form circular openings 18, and the recesses 16 of two bricks abut to form rectangular or square openings 19. A plurality of combined spacing and baffle bricks or tiles 20 extend transversely of the gas channels 12ª and have their reduced ends 20ª inserted and built into the square openings 17. Long tiles 19 of square cross-section extend through the openings 16, as shown in Figures 5 and 6. The round or circular openings 18 form communicating gas passageways between the gas channels 12ª, so that the pressure and flow of the gases may be equalized in all of the gas channels.

The round or circular openings 18 also serve as ports through which suitable cleaning tools or fluid pressure nozzles may be passed when cleaning the dust from the checker wall.

The side and top walls of the regenerative chambers are provided with ports 22 and 23, respectively, closed by removable closures 24. The ports 22 are in line with the openings 18 in the checker walls, and the ports 23 are in line with the gas channels 12$^a$, and are adapted to permit the entering of the cleaning tools or fluid pressure nozzles for cleaning the dust from the checkerwork and forcing it down into the dust receiving pockets 11 between the walls 10.

A plurality of clean-out openings 25 are formed along each side of the regenerative chambers adjacent their bottom, and communicate with the dust receiving pockets 11 to permit the removal of the collected dust from the pockets. The openings 25 are provided with removable closures 26.

Regenerative chambers constructed as above described, have many advantages over the chambers of the prior art; for instance, a better distribution of the gases and air passing through the chambers is had; there are no cool or dead areas of checkerwork; the checkerwork does not retain the dust in any great quantities, and what dust is retained may be readily removed without interrupting the operation of the chambers; and due to general improved construction the efficiency of the chambers is greatly increased.

While I have shown and described one preferred embodiment of my invention, it will be understood that I do not wish to be limited thereto, since various modifications may be made without departing from the scope of my invention as defined in the appended claims.

I claim:

1. The combination with an open hearth furnace, of at least one regenerative chamber comprising an enclosing shell, a dust collecting base in said shell composed of a plurality of transversely arranged spaced walls, the spaces between said walls forming dust collecting chambers, said shell being provided with openings communicating with said dust collecting chambers through which the dust may be removed, a plurality of vertical checker walls extending longitudinally of said shell above said first named walls and spaced one from the other to form longitudinally extending gas channels, said last named walls being provided with relatively widely spaced small openings forming communicating gas passageways between said channels adapted to equalize the pressure and flow in all of said channels.

2. The combination with an open hearth furnace, of at least one regenerative chamber comprising an enclosing shell, a dust collecting base in said shell composed of a plurality of transversely arranged spaced walls, the spaces between said walls forming dust collecting chambers, said shell being provided with openings communicating with said dust collecting chambers through which the dust may be removed, a plurality of vertical checker walls extending longitudinally of said shell above said first named walls and spaced one from the other to form longitudinally extending gas channels, said last named walls being provided with relatively widely spaced small openings forming communicating gas passageways between said channels adapted to equalize the pressure and flow in all of said channels, and combined spacing and baffling members built into said walls and extending transversely of said gas channels.

3. The combination with an open hearth furnace, of at least one regenerative chamber comprising an enclosing shell, a dust collecting base in said shell composed of a plurality of transversely arranged spaced walls, the spaces between said walls forming dust collecting chambers, said shell being provided with openings communicating with said dust collecting chambers through which the dust may be removed, a plurality of vertical checker walls extending longitudinally of said shell above said first named walls and spaced one from the other to form longitudinally extending gas channels, said last named walls being provided with relatively widely spaced small openings forming communicating gas passageways between said channels adapted to equalize the pressure and flow in all of said channels, said shell being provided with a plurality of openings, some of which are in line with said openings in said checker walls and others of which communicate with said gas channels, said openings being adapted to permit the entering of cleaning tools for forcing the dust from said checker walls down into said dust collecting chambers.

4. The combination with an open hearth furnace, of at least one regenerative chamber, comprising an enclosing shell communicating at one end with said furnace and at the other end with a stack, an induced draft fan for increasing the draft through said chamber, said chamber being of gradually reduced cross-section from said furnace end toward said stack end, a checkerwork in said chamber, said checkerwork comprising a plurality of relatively solid vertical walls of uniform thickness spaced one from the other to form longitudinally extending gas channels of uniform width, and combined spacing and baffling members built into said walls and extending transversely of said gas channels.

5. The combination with an open hearth furnace, of at least one regenerative chamber, comprising an enclosing shell communicating at one end with said furnace and at the other end with a stack, an induced draft fan for increasing the draft through said chamber, said chamber being of gradually reduced cross-section from said furnace end toward said stack end, a dust collecting base in said shell composed of a plurality of transversely arranged spaced walls, the spaces between said walls forming dust collecting chambers, said shell being provided with openings communicating with said dust collecting chambers through which the dust may be removed, a plurality of vertical checker walls of uniform thickness extending longitudinally of said shell above said first named walls and spaced one from the other to form longitudinally extending gas channels of uniform width, said last named walls being provided with widely spaced relatively small openings forming communicating gas passageways between said channels adapted to equalize the pressure and flow in all of said channels.

6. The combination with an open hearth furnace, of at least one regenerative chamber, comprising an enclosing shell communicating at one end with said furnace and at the other end with a stack, said chamber being of gradually reduced cross-section from said furnace end toward said stack end, a dust collecting base in said shell composed of a plurality of transversely arranged spaced walls, the spaces between said walls forming dust collecting chambers, said shell being provided with openings communicating with said dust collecting chambers through which the dust may be removed, a plurality of vertical checker walls of uniform thickness extending longitudinally of said shell above said first named walls and spaced one from the other to form longitudinally extending gas channels of uniform width, said last named walls being provided with widely spaced relatively small openings forming communicating gas passageways between said channels adapted to equalize the pressure and flow in all of said channels, said shell being provided with a plurality of openings in its top and side walls, said openings in said top wall being in line with said gas channels and said openings in said side walls being in line with the openings in said checker walls, said openings being adapted to permit the entering of cleaning tools for blowing the dust from said checkerwork down into said dust collecting chambers.

In testimony whereof, I have hereunto set my hand.

FRANK R. McGEE.